United States Patent
Eo et al.

(10) Patent No.: US 11,137,067 B2
(45) Date of Patent: Oct. 5, 2021

(54) AUTOMATIC TRANSMISSION FOR VEHICLE

(71) Applicants: Hyundai Motor Company, Seoul (KR); Kia Motors Corporation, Seoul (KR)

(72) Inventors: Soon Ki Eo, Ansan-si (KR); Ki Jong Park, Hwaseong-si (KR); Ma Ru Kang, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 764 days.

(21) Appl. No.: 15/978,534

(22) Filed: May 14, 2018

(65) Prior Publication Data

US 2019/0162299 A1    May 30, 2019

(30) Foreign Application Priority Data

Nov. 28, 2017 (KR) .......................... 10-2017-0160103

(51) Int. Cl.
*F16H 61/02* (2006.01)
*F16H 63/04* (2006.01)
(Continued)

(52) U.S. Cl.
CPC ......... *F16H 61/0295* (2013.01); *F16D 23/10* (2013.01); *F16H 3/006* (2013.01);
(Continued)

(58) Field of Classification Search
CPC .... F16H 61/0295; F16H 3/006; F16H 61/688; F16H 63/04; F16H 63/067; F16D 23/10
See application file for complete search history.

(56) References Cited

U.S. PATENT DOCUMENTS 1,686,827 A * 10/1928 Maag ...................... F16D 23/10
                                                   192/103 F
2,189,748 A    2/1940 Wilson
(Continued)

FOREIGN PATENT DOCUMENTS

FR    2545883 A1    11/1984
JP    5909135 B2    4/2016
(Continued)

OTHER PUBLICATIONS

U.S. Appl. No. 15/823,135, filed Nov. 27, 2017.
U.S. Appl. No. 15/978,674, filed May 14, 2018.

*Primary Examiner* — Terence Boes
(74) *Attorney, Agent, or Firm* — Morgan Lewis & Bockius LLP

(57) ABSTRACT

An automatic transmission may include a rotating shaft; a slider portion provided on the rotating shaft; a first connecting member having one end hinged to the rotating shaft and the other end rising or falling by a centrifugal force as the rotating shaft rotates; a second connecting member having one end hinged to the first connecting member and the other end connected to a slider portion to vertically slide the slider as the first connecting member rises or falls; a diaphragm spring coupled to the slider portion and deformed in an axial direction of the rotating shaft depending on position of the slider portion; a shift fork connected to the slider portion or the diaphragm spring and engaging a synchronizer with a shift stage gear depending on position of the slider portion; an elastic regulator controlling an elastic force of the diaphragm spring; and a controller controlling the elastic regulator.

10 Claims, 7 Drawing Sheets

(51) Int. Cl.
*F16D 23/10* (2006.01)
*F16H 3/00* (2006.01)
*F16H 63/06* (2006.01)
*F16H 61/688* (2006.01)

(52) U.S. Cl.
CPC ........... *F16H 61/688* (2013.01); *F16H 63/04* (2013.01); *F16H 63/067* (2013.01); *F16H 2200/0034* (2013.01); *F16H 2708/18* (2013.01)

(56) References Cited

U.S. PATENT DOCUMENTS

| | | | |
|---|---|---|---|
| 2,386,217 A * | 10/1945 | Kegresse | F16H 3/006 |
| | | | 74/330 |
| 2,654,261 A * | 10/1953 | Youngren | F16H 3/097 |
| | | | 74/336 R |
| 2,730,909 A * | 1/1956 | Lathrop | F16H 61/0295 |
| | | | 477/121 |
| 4,637,270 A * | 1/1987 | Yanagiuchi | F16H 3/089 |
| | | | 477/108 |
| 4,809,823 A | 3/1989 | Fargier | |
| 5,989,149 A * | 11/1999 | Apostolo | F16H 15/46 |
| | | | 476/11 |
| 5,997,432 A | 12/1999 | Neubauer et al. | |
| 10,415,658 B2 | 9/2019 | Eo et al. | |
| 2019/0032731 A1* | 1/2019 | Eo | F16D 23/02 |
| 2019/0162299 A1 | 5/2019 | Eo et al. | |
| 2019/0162300 A1* | 5/2019 | Eo | F16H 63/30 |

FOREIGN PATENT DOCUMENTS

| | | |
|---|---|---|
| KR | 10-1995-0027229 A | 10/1995 |
| KR | 10-0580845 B1 | 5/2006 |
| KR | 10-2015-0077732 A | 7/2015 |

* cited by examiner

AUTOMATIC TRANSMISSION FOR VEHICLE

CROSS REFERENCE TO RELATED APPLICATION

The present application claims priority to Korean Patent Application No. 10-2017-0160103, filed on Nov. 28, 2017, the entire contents of which is incorporated herein for all purposes by this reference.

BACKGROUND OF THE INVENTION

Field of the Invention

The present invention relates to a transmission for a vehicle, and more particularly, to an automatic transmission for a vehicle.

Description of Related Art

Generally, an automatic transmission is implemented by a combination of a plurality of planetary gear sets, and functions to automatically shift rotational power transmitted from a torque converter to multi stages and transmit the rotational power to an output shaft. In addition, since the automatic transmission can be designed to have a more appropriate transmission ratio as the number of shift stages which can be implemented is increased and can implement a vehicle excellent in power performance and fuel efficiency, researches for implementing more shift stages have been steadily conducted.

Meanwhile, in the vehicle to which the automatic transmission is applied, the shifting is automatically performed based on a predetermined shift pattern. More specifically, the shifting to a target shift stage is performed by controlling a plurality of synchronizers to be engaged or disengaged depending on a vehicle speed and a stepping amount of an accelerator pedal based on a predetermined shift pattern.

However, for this purpose, a controller for controlling data detected by a vehicle speed sensor for detecting the vehicle speed, an accelerator pedal sensor (APS) or the like to engage or disengage the plurality of synchronizers with or from the shift stage gear based on the predetermined shift pattern is required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an automatic transmission for a vehicle configured for performing automatic shifting by engaging or disengaging a plurality of synchronizers with or from a shift stage gear by a mechanical operation depending on a vehicle speed without including an electronic controller which engages or disengages the plurality of synchronizers with or from the shift stage gear for a vehicle shift.

According to an exemplary embodiment of the present invention, there is provided an automatic transmission for a vehicle, including: a rotation shaft rotating by a driving force of the vehicle; a slider portion provided on the rotation shaft and provided to slide along an axial direction of the rotation shaft; a first connecting member having one end portion hinged to the rotation shaft and the other end portion rising or falling by a centrifugal force as the rotation shaft rotates; a second connecting member having one end portion hinged to the first connecting member and the other end portion connected to a slider portion to vertically slide the slider portion as the first connecting member rises or falls; a diaphragm spring coupled to the slider portion and deformed to one side or the other side in an axial direction of the rotation shaft depending on the position of the slider portion; a shift fork connected to the slider portion or the diaphragm spring and engaging a synchronizer with a shift stage gear depending on the position of the slider portion; an elastic regulator controlling an elastic force of the diaphragm spring; and a controller configured for controlling the elastic regulator depending on a vehicle speed to regulate an elastic force of the diaphragm spring.

The automatic transmission for a vehicle may further include: a first link portion provided on the rotation shaft and hinged to one end portion of the first connecting member; a second link portion provided on the rotation shaft, provided under the first link portion, hinged to the other end portion of the second connecting member, and having a lower surface coupled to the slider portion; and a compression spring provided on the rotation shaft, disposed between the first link portion and the second link portion, and provided to apply an elastic force.

The elastic regulator may compress or relax the compression spring to vertically slide the slider portion along the axial direction of the rotation shaft, and vertically slide the slider portion along the axial direction of the rotation shaft to regulate the elastic force of the diaphragm spring.

The controller may be configured to control the elastic regulator depending on the vehicle speed to compress or relax the compression spring to vertically slide the slider portion along the axial direction of the rotation shaft, and vertically slide the slider portion along the axial direction of the rotation shaft to regulate the elastic force of the diaphragm spring.

The elastic regulator may include: a motor; a cam gear provided on the rotation shaft and connected to the motor; a base portion provided on the rotation shaft and integrally formed with the cam gear; and a compression spring position regulator provided on the rotation shaft, positioned between the base portion and the compression spring, and moving upward and downward according to the rotation of the motor to compress or relax the compression spring.

The elastic regulator may include: a cylinder positioned above the compression spring; a pressure providing portion providing a pressure to the cylinder; and a piston positioned inside the cylinder, positioned above the compression spring and moving upward and downward as a pressure is applied to the cylinder to compress or relax the compression spring.

The elastic regulator may include: a pair of magnetic bodies having the same pole and positioned above and under each other while being spaced from each other; and a piston coupled to a lower surface of the magnetic body positioned under the compression spring and positioned above the compression spring and moving upward and downward as a magnetic force of a magnetic body is changed to compress or relax the compression spring.

The diaphragm spring may be provided to be deformed to one side or the other side in the axial direction of the rotation shaft when reaching a predetermined amount of deformation, and the shift fork may be connected to the diaphragm spring or the slider portion so that the synchronizer starts to be engaged with the shift stage gear when the diaphragm spring is deformed.

The shift fork may be fixedly coupled to the diaphragm spring or the slider portion to integrally slide.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
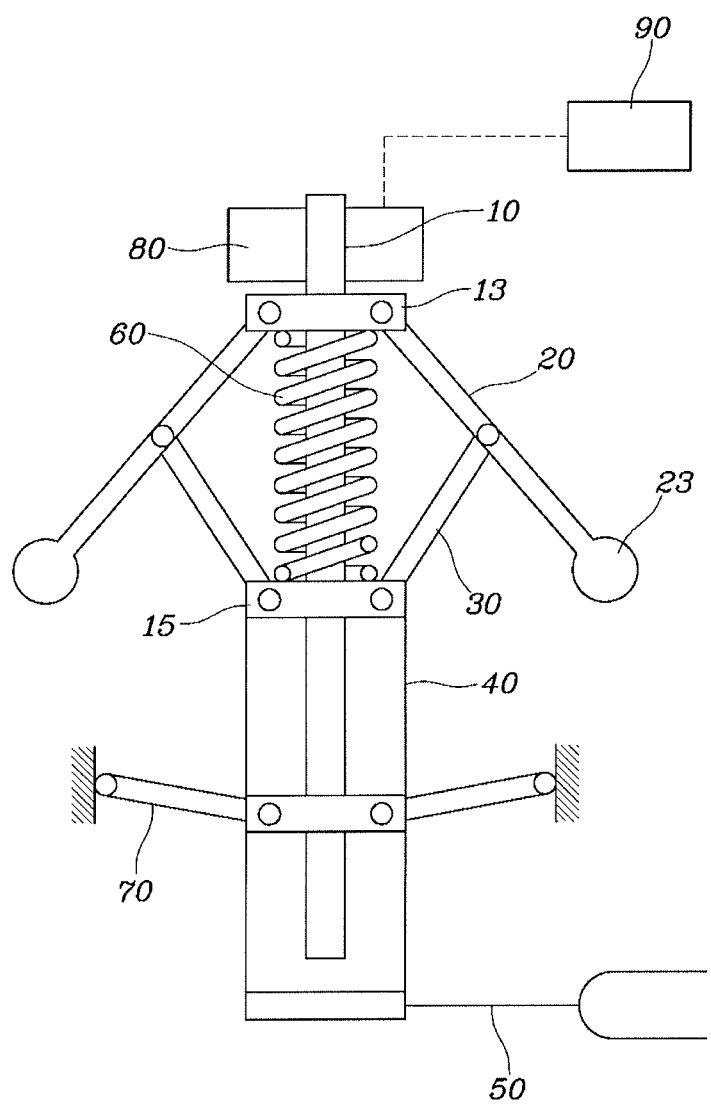
FIG. 1 is a diagram illustrating an operation of an automatic transmission for a vehicle when a vehicle is traveling at a low speed in the automatic transmission for a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an automatic transmission for a vehicle according to exemplary embodiments of the present invention will be described with reference to the accompanying drawings.

Figure 2:
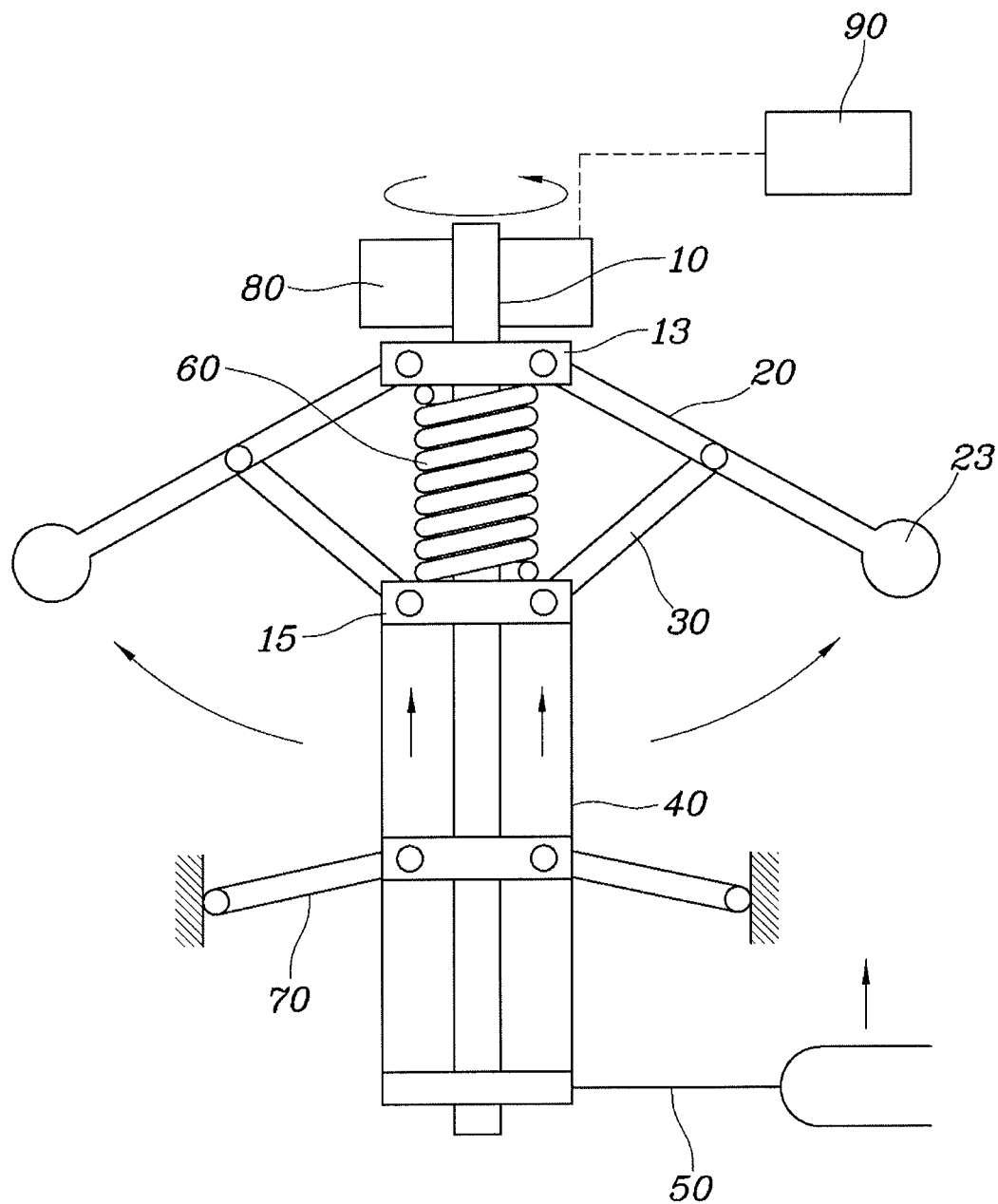
FIG. 2 is a diagram illustrating an operation of the automatic transmission for a vehicle when a vehicle is traveling at a high speed in the automatic transmission for a vehicle according to the exemplary embodiment of the present invention.

FIG. 1 is a diagram illustrating an operation of an automatic transmission for a vehicle when a vehicle is traveling at a low speed in the automatic transmission for a vehicle according to an exemplary embodiment of the present invention and FIG. 2 is a diagram illustrating an operation of the automatic transmission for a vehicle when a vehicle is traveling at a high speed.

Referring to FIG. 1 and FIG. 2, an automatic transmission for a vehicle according to an exemplary embodiment of the present invention may include a rotation shaft 10 rotating by a driving force of the vehicle; a slider portion 40 provided on the rotation shaft 10 and provided to slide along an axial direction of the rotation shaft; a first connecting member 20 having one end portion hinged to the rotation shaft and the other end portion rising or falling by a centrifugal force as the rotation shaft rotates; a second connecting member 30 having one end portion hinged to the first connecting member 20 and the other end portion connected to a slider portion 40 to vertically slide the slider portion 40 as the first connecting member 20 rises or falls; a diaphragm spring 70 coupled to the slider portion 40 and deformed to one side or the other side in an axial direction of the rotation shaft 10 depending on the position of the slider portion 40; a shift fork 50 connected to the slider portion 40 or the diaphragm spring 70 and engaging a synchronizer with a shift stage gear depending on the position of the slider portion 40; an elastic regulator 80 controlling an elastic force of the diaphragm spring 70; and a controller 90 controlling the elastic regulator 80 depending on a vehicle speed to regulate an elastic force of the diaphragm spring.

Furthermore, the automatic transmission for a vehicle according to an exemplary embodiment of the present invention may further include: a first link portion 13 provided on the rotation shaft and hinged to one end portion of the first connecting member; a second link portion 15 provided on the rotation shaft, provided under the first link portion, hinged to the other end portion of the second connecting member, and having a lower surface coupled to the slider portion; and a compression spring 60 provided on the rotation shaft, disposed between the first link portion and the second link portion, and provided to apply an elastic force.

That is, according to the exemplary embodiment of the present invention, the rotation shaft 10 rotates as the vehicle moves and the first connecting member 20 hinge-rotates in a direction in which a centrifugal pendulum 23 rises or falls by the centrifugal force as the rotation shaft 10 rotates, such that the slider portion 40 slides vertically, the diaphragm spring 70 coupled to the slider portion 40 as the slider portion 40 slides vertically to be deformed to one side or the other side in the axial direction of the rotation shaft according to a position of the slider portion 40, and the synchronizer (SL) is engaged with or disengaged from the shift stage gear while the shift fork 50 connected to the diaphragm spring 70 moves upward or downward as the diaphragm spring 70 is deformed, performing the shifting of the vehicle.

When the speed of the rotation shaft 10 is increased, the first connecting member 20 rises, such that the slider portion 40 may slide up, the diaphragm spring 70 may be deformed to one side in the axial direction of the rotation shaft as the slider potion 40 slides up, and the shift fork 50 may move upward as the diaphragm spring 70 is deformed to one side thereof.

Conversely, when the speed of the rotation shaft 10 is reduced, the first connecting member 20 falls, such that the slider portion 40 may slide down, the diaphragm spring 70 may be deformed at the other side in the axial direction of the rotation shaft as the slider portion 40 slides down, and the shift fork 50 may move downward as the diaphragm spring 70 is deformed at the other side thereof.

Accordingly, according to the exemplary embodiment of the present invention, it is possible to perform the automatic shifting by engaging or disengaging the plurality of synchronizers with or from the shift stage gear by the mechanical operation depending on the vehicle speed as described above without including the electronic controller which performs an electronic control to engage or disengage the plurality of synchronizers with or from the shift stage gear, performing the vehicle shift.

Hereinafter, the detailed structure of the automatic transmission for a vehicle according to the exemplary embodiment of the present invention will be described more specifically.

The first connecting member 20 which hinge-rotates with respect to the first linking portion 13 is provided on the rotation shaft 10. The other end portion of the first connecting member 20 may be provided with the centrifugal pendulum 23 to maximize the centrifugal force generated as the rotation shaft 10 rotates.

One end portion of the first connecting member 20 is hinged to the first link portion 13 and the other end portion thereof provided with the centrifugal pendulum 23 rises or falls by the centrifugal force as the rotation shaft rotates. Furthermore, since a middle portion of the first connecting member 20 and one end portion of the second connecting member 30 are hinged to each other and the other end portion of the second connecting member 30 is hinged to the second link portion 15, when the first connecting member 20 moves upward or downward as the rotation shaft 10 rotates, the second connecting member 30 may hinge-rotate with respect to one end portion along the first connecting member 20.

The slider portion 40 may be provided in a shape having a plurality of rings that can move axially while enclosing the rotation shaft 10 according to the exemplary embodiment of the present invention, and may be provided in a single cylindrical shape. That is, since the shape of the slider portion 40 may be designed to be variously changed according to the designer or the vehicle, the slider portion 40 may not be limited to a specific shape.

The shift fork 50 may be connected to the slider portion 40 or the diaphragm spring 70 and may move according to the position of the slider portion 40 to engage or disengage the synchronizer (SL) with or from the shift stage gear. At the present time, the shift fork 50 may be fixedly coupled to the diaphragm spring 70 or the slider portion 40 to integrally slide. Furthermore, the shift fork 50 may be provided so that the synchronizer (SL) is engaged with or disengaged from the shift stage gear when the diaphragm spring 70 is deformed. The operation of the shift fork 50 which engages or disengages the synchronizer (SL) with or from the shift stage gear according to the position of the slider portion 40 will be described below more specifically with reference to FIG. 7.

The compression spring 60 may be provided on the rotation shaft and disposed between the first link portion 13 and the second link portion 15 to apply the elastic force. The compression spring 60 may be compressed or relaxed when the other end portion of the first connecting member 20 rises or falls by the centrifugal force as the rotation shaft 10 rotates.

The diaphragm spring 70 may be provided on the rotation shaft 10 and may be coupled to the slider portion 40 to be deformed to one side or the other side in the axial direction of the rotation shaft 10 according to the sliding position of the slider portion 40. Here, the fact that the diaphragm spring 70 is deformed to one side or the other side in the axial direction of the rotation shaft 10 may mean that the direction of the elastic force applied by the diaphragm spring 70 is switched.

According to the exemplary embodiment of the present invention, the diaphragm spring 70 may be provided to be deformed to one side or the other side in the axial direction of the rotation shaft when reaching a predetermined amount of deformation. That is, if a load is applied to the diaphragm spring 70, the diaphragm spring 70 starts to be deformed. When the diaphragm spring 70 reaches the predetermined amount of deformation while the load is applied to the diaphragm spring 70, the diaphragm spring 70 may be deformed while being folded, such that the direction of the elastic force applied by the diaphragm spring 70 may be switched.

That is, as the vehicle speed rises and thus the slider portion 40 moves upward by the centrifugal force acting on the first connecting member 20, the load is applied to the diaphragm spring 70 and thus the diaphragm spring 70 starts to be deformed, and if the diaphragm spring 70 reaches the predetermined amount of deformation, the diaphragm spring 70 is deformed as shown in FIG. 2 to switch the application direction of the elastic force. Furthermore, the shift fork 50 is provided so that a sleeve of the synchronizer starts to be engaged with or disengaged from the shift stage gear when the diaphragm spring 70 is deformed, whereby the synchronizer may be more easily engaged with or disengaged from the shift stage gear by the elastic force of the diaphragm spring 70. Here, the diaphragm spring 70 may be fixedly provided to the component including a housing so that one end portion thereof is coupled to the slider portion 40 and the other end portion thereof rotates together with the rotation shaft 10 but does not move in the axial direction thereof.

The elastic regulator 80 is configured to regulate the elastic force of the diaphragm spring 70. That is, the elastic regulator 80 may regulate the deformation amount of the diaphragm spring 70 by regulating the load applied to the diaphragm spring 70. The elastic regulator 80 compresses or relaxes the compression spring 60 so that the slider portion 40 slides upward and downward along the axial direction of the rotation shaft 10 and the slider portion 40 slides upward and downward along the axial direction of the rotation shaft 10, regulating the elastic force of the diaphragm spring 70.

Figure 3:
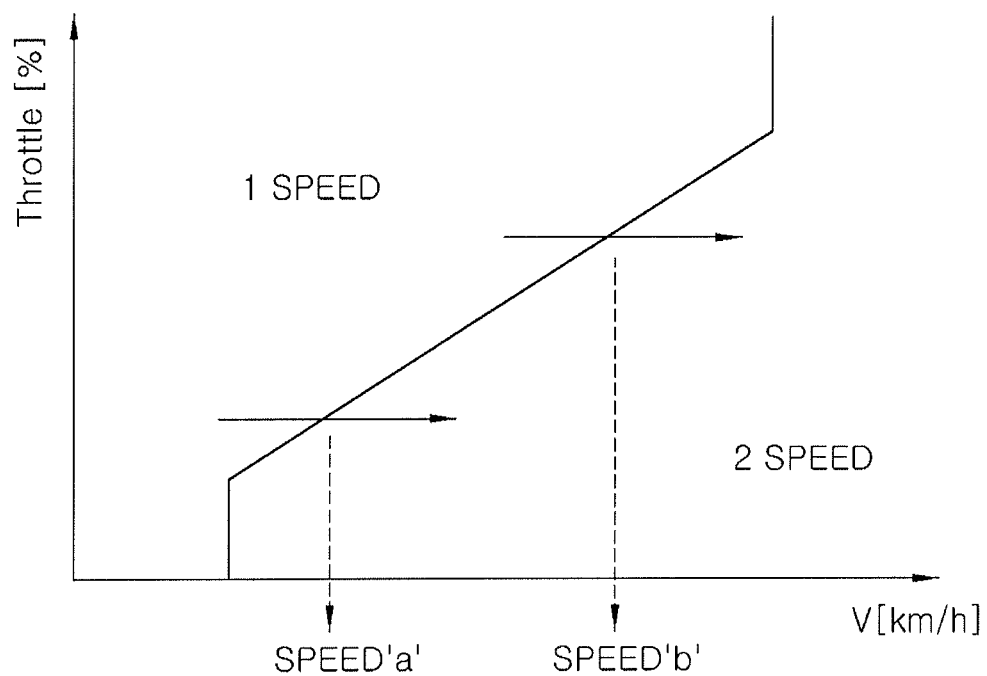
FIG. 3 is a diagram illustrating a shift map of a two-shift transmission in the automatic transmission for a vehicle according to the exemplary embodiment of the present invention.

FIG. 3 is a diagram illustrating a shift map of a two-shift transmission in the automatic transmission for a vehicle according to the exemplary embodiment of the present invention. As illustrated in FIG. 3, the vehicle speed shifted from a first stage to a second stage may not be constant. That is, the shifting from the first stage to the second stage may not be only performed only when the vehicle is traveling at a specific speed or greater, but also the shifting from the first stage to the second stage may be performed even within a range of various vehicle speeds including a specific speed or less. To appropriately perform the shifting within a range of various vehicle speeds, the elastic regulator 80 may regulate the elastic force of the diaphragm spring 70.

According to the exemplary embodiment of the present invention, the rotation shaft 10 rotates as the vehicle travels, the first connecting member 20 rises as the rotation shaft 10 rotates to raises the slider portion 40, a load is applied to the diaphragm spring 70 to deform the diaphragm spring 70, and the shifting may be performed when the diaphragm spring 70 reaches the predetermined amount of deformation. That is, to perform the shifting, the predetermined load is applied to the diaphragm spring 70, such that the diaphragm spring 70 reaches the predetermined amount of deformation. However, since the load applied to the diaphragm spring 70 when the vehicle travels at a high speed and the load applied to the diaphragm spring 70 when the vehicle travels at a low speed are different, the elastic regulator 80 regulates the elastic force of the diaphragm spring 70 to appropriately perform the shifting within a range of various vehicle speeds.

As a more specific example, when a load of 10 kg is applied to the diaphragm spring 70, the diaphragm spring 70 reaches the predetermined amount of deformation to be deformed, and thus the shifting is performed. As illustrated in FIG. 3, the shifting is performed depending on the shift map when the vehicle speed is Akm/h and Bkm/h, and it is considered that a load applied to the diaphragm spring is 5 kg when the vehicle speed is Akm/h and a load applied to the diaphragm spring is 10 kg when the vehicle speed is Bkm/h. In the instant case, when the vehicle speed is Akm/h, since the load applied to the diaphragm spring is 5 kg nevertheless that the shifting may be performed depending on the shift map, the diaphragm spring does not reach the predetermined amount of deformation, and thus the shifting may not be performed, such that the elastic regulator 80 regulates the elastic force of the diaphragm spring depending on the vehicle speed, appropriately performing the vehicle speed according to the shift map in various vehicle speeds. That is, when the vehicle speed is Akm/h, the elastic regulator 80 applies a load of 5 kg to the diaphragm spring in advance, so that the diaphragm spring reaches the predetermined amount of deformation when the vehicle travels at the speed of Akm/h, performing the shifting.

Figure 4:
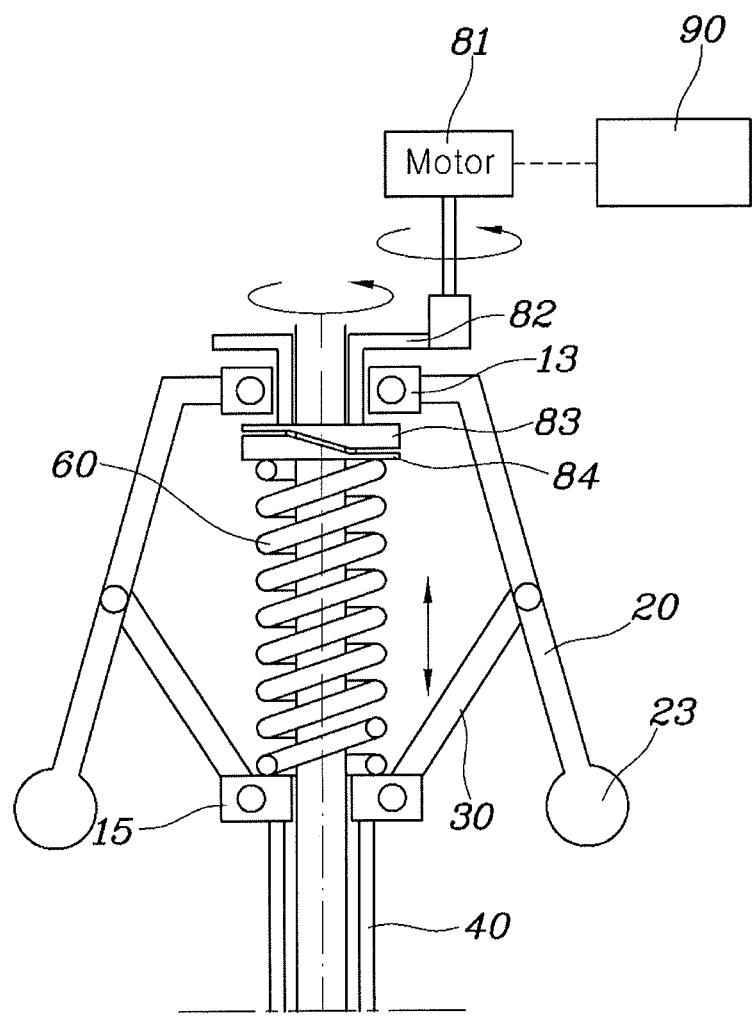
FIG. 4 is a diagram illustrating more specifically an appearance of an elastic regulator according to various exemplary embodiments of the present invention, in the automatic transmission for a vehicle of the present invention.
Figure 5:
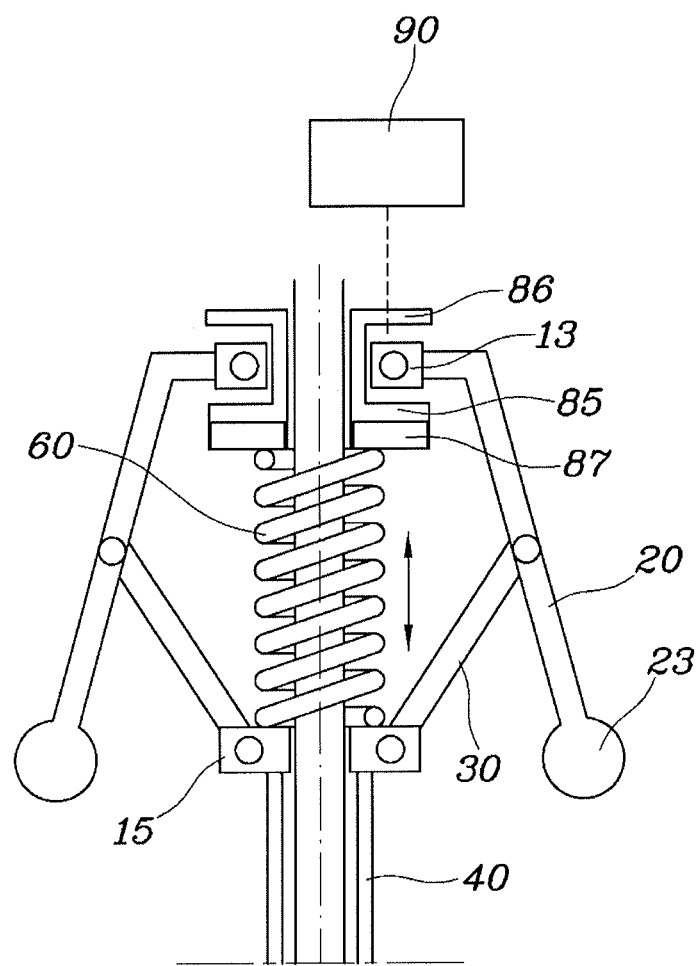
FIG. 5 is a diagram illustrating more specifically an appearance of an elastic regulator according to various exemplary embodiments of the present invention, in the automatic transmission for a vehicle of the present invention.
Figure 6:
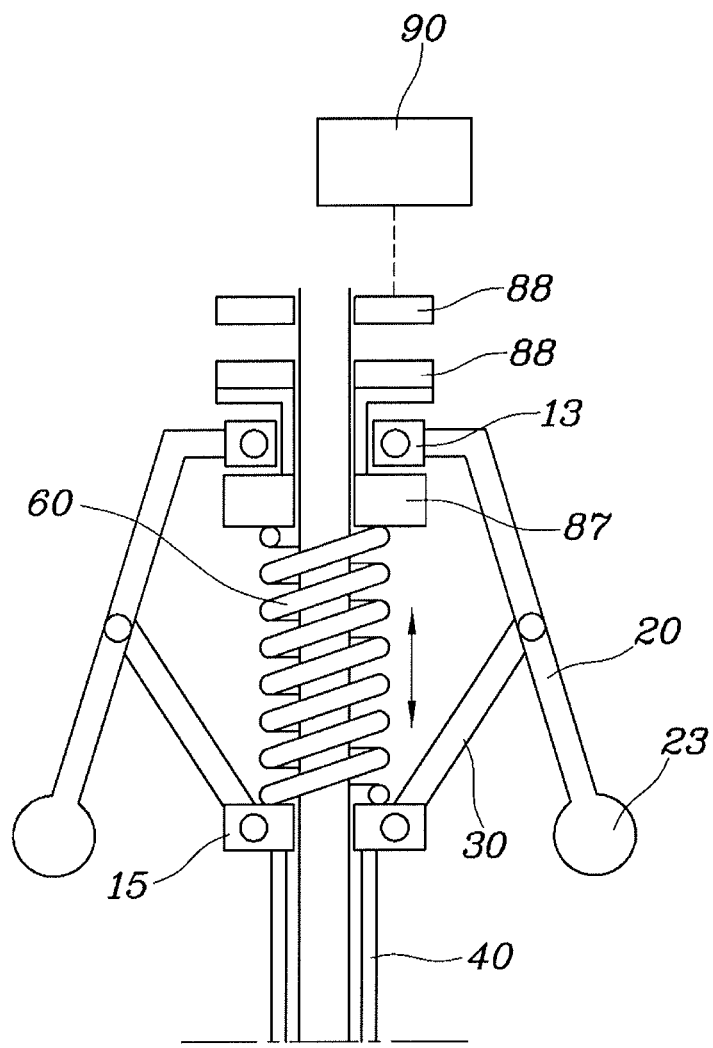
FIG. 6 is a diagram illustrating more specifically an appearance of an elastic regulator according to various exemplary embodiments of the present invention, in the automatic transmission for a vehicle of the present invention.

FIG. 4 is a diagram illustrating more specifically an appearance of an elastic regulator according to various exemplary embodiments of the present invention, in the automatic transmission for a vehicle of the present invention, FIG. 5 is a diagram illustrating more specifically an appearance of an elastic regulator according to various exemplary embodiments of the present invention, and FIG. 6 is a diagram illustrating more specifically an appearance of an elastic regulator according to various exemplary embodiments.

As illustrated in FIG. 4, the elastic regulator 80 may be configured to include a motor 81, a cam gear 82 provided on the rotation shaft 10 and connected to the motor 10, a base portion 83 provided on the rotation shaft 10 and integrally formed with the cam gear 82, and a compression spring position regulator 84 provided on the rotation shaft 10, positioned between the base portion 83 and the compression spring 60, and moving upward and downward according to the rotation of the motor 81 to compress or relax the compression spring 60.

In the instant case, according to the exemplary embodiment of the present invention, if the motor 81 rotates counterclockwise to rotate the motor gear, the motor gear rotates the cam gear 82 and the cam gear 82 rotates the compression spring position regulator 84 integrally formed with the cam gear 82. At the present time, the base portion 83 positioned above the compression spring position regulator 84 pushes the compression position regulator 84 downwardly to compress the compression spring 60, and the slider portion 40 slides downward as the compression spring 60 is compressed to apply a load to the diaphragm spring 70 coupled to the slider portion 40, regulating the elastic force of the diaphragm spring 70. If the motor 81 rotates clockwise, the elastic force of the diaphragm spring 70 may be regulated in a reverse order of the above-described manner.

Furthermore, as illustrated in FIG. 5, the elastic regulator 80 may be configured to include a cylinder 85 positioned above the compression spring 60, a pressure providing portion 86 providing a pressure to the cylinder 85, and a piston 87 slidably positioned inside the cylinder, positioned above the compression spring and moving upward and downward as a pressure is applied to the cylinder to compress or relax the compression spring. In the instant case, the pressure providing portion provides a pressure to the cylinder to move the piston downward to compress the compression spring, and as the compression spring is compressed, the slider portion slides downward to apply a load to the diaphragm spring coupled to the slider portion, regulating the elastic force of the diaphragm spring. Here, the manner of providing the pressure by the pressure providing portion may be pneumatic or hydraulic.

Furthermore, as illustrated in FIG. 6, the elastic regulator 80 may be configured to include a pair of magnetic bodies 88 having the same pole on facing direction of the magnetic bodies 88 and positioned above and under each other while being spaced from each other, and a piston 87 coupled to a lower surface of the magnetic body positioned on a lower side of the magnetic bodies 88 and positioned above the compression spring and moving upward and downward as a magnetic force of a magnet is changed to compress or relax the compression spring.

In an exemplary embodiment of the present invention, the upper magnetic body of the magnetic bodies 88 may be positioned to be stationary.

In the instant case, the lower magnetic body positioned on a lower side of the magnetic bodies 88 moves downward as the strength of the magnetic force of the pair of magnetic bodies is changed to compress the compression spring, and the slider portion slides downward as the compression spring is compressed to apply a load to the diaphragm spring coupled to the slider portion, regulating the elastic force of the diaphragm spring.

The controller 90 controls the elastic regulator 80 depending on the vehicle speed to compress or relax the compression spring 60, vertically sliding the slider portion 40 along the axial direction of the rotation shaft, and vertically slides the slider portion 40 along the axial direction of the rotation shaft to regulate the elastic force of the diaphragm spring 70, appropriately performing the shifting in the range of various vehicle speeds.

Figure 7:
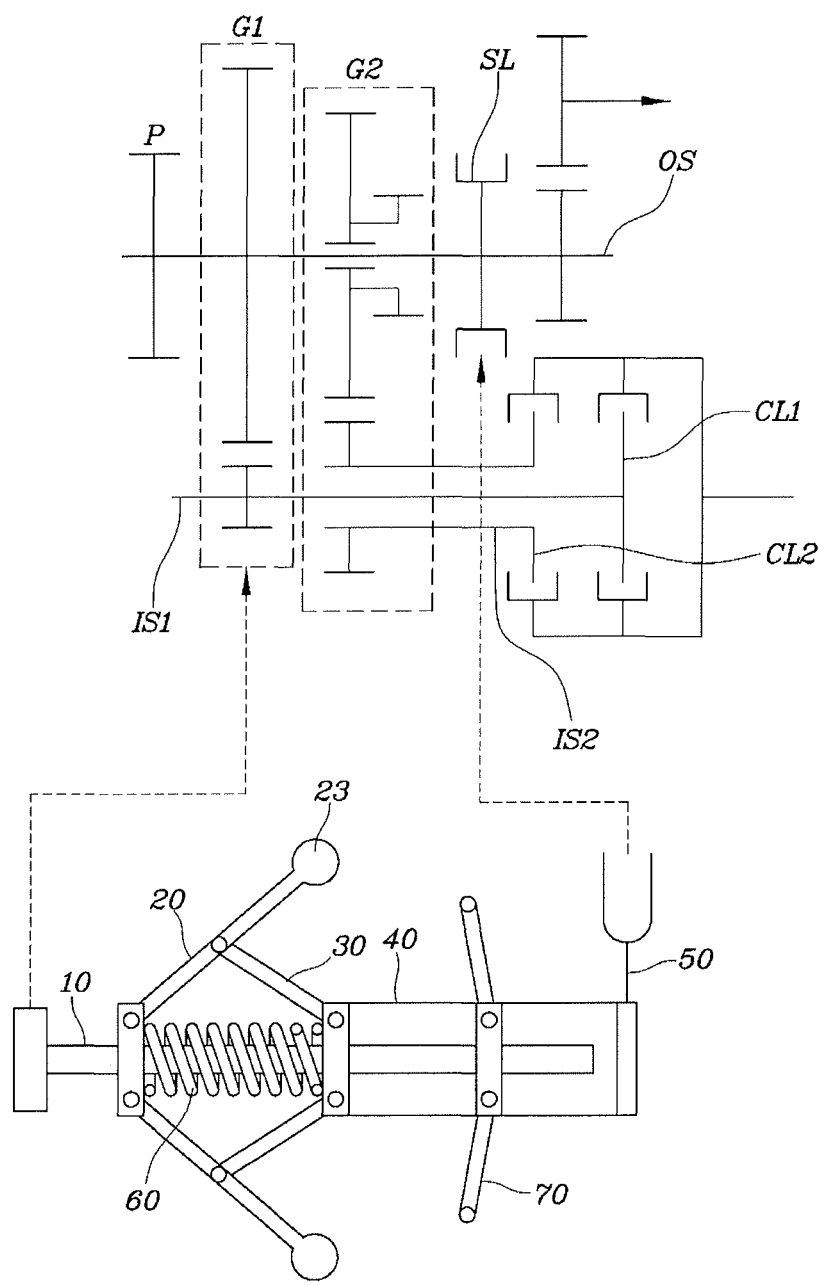
FIG. 7 is a diagram schematically illustrating a transmission structure to which the automatic transmission for a vehicle according to the exemplary embodiment of the present invention is applied.

FIG. 7 is a diagram schematically illustrating a transmission structure to which the automatic transmission for a vehicle according to the exemplary embodiment of the present invention is applied. Referring to FIG. 7, the automatic transmission for a vehicle according to the exemplary embodiment of the present invention may be applied to a dual clutch transmission (DCT) vehicle, and as described above, the rotation shaft 10 rotates as the vehicle moves and the first connecting member 20 hinge-rotates in a direction in which a centrifugal pendulum 23 rises or falls by the centrifugal force as the rotation shaft 10 rotates, such that the slider portion 40 slides vertically, the diaphragm spring 70 coupled to the slider portion 40 as the slider portion 40 slides vertically to be deformed to one side or the other side in the axial direction of the rotation shaft according to a position of the slider portion 40, and the synchronizer (SL) is engaged with or disengaged from the shift stage gear while the shift fork 50 connected to the slider portion 40 moves upward and downward as the diaphragm spring 70 is deformed, performing the shifting of the vehicle.

As described above, according to the exemplar embodiment of the present invention, it is possible to perform the automatic shifting by engaging or disengaging the plurality of synchronizers with or from the shift stage gear by the mechanical operation depending on the vehicle speed without including the electronic controller which performs the electronic control to engage or disengage the plurality of synchronizers with or from the shift stage gear, performing the vehicle shift.

According to the exemplary embodiment of the present invention, the controller can control the elastic regulator depending on the vehicle speed to compress or relax the compression spring to vertically slide the slider portion along the axial direction of the rotation shaft, and vertically slide the slider portion along the axial direction of the rotation shaft to regulate the elastic force of the diaphragm spring, appropriately performing the shifting within the range of various vehicle speeds.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automatic transmission for a vehicle, comprising:
a rotation shaft rotating by a driving force of the vehicle;
a slider portion provided on the rotation shaft and provided to slide along an axial direction of the rotation shaft;
a first connecting member having a first end portion hinged to the rotation shaft and a second end portion rising or falling by a centrifugal force as the rotation shaft rotates;
a second connecting member having a first end portion hinged to the first connecting member and a second end portion connected to a slider portion to vertically slide the slider portion as the first connecting member rises or falls;
a diaphragm elastic member coupled to the slider portion and deformed to a first side or a second side in an axial direction of the rotation shaft depending on a position of the slider portion;
a shift fork connected to the slider portion or the diaphragm elastic member and engaging a synchronizer with a shift stage gear depending on a position of the slider portion;
an elastic regulator controlling an elastic force of the diaphragm elastic member; and
a controller configured to control the elastic regulator depending on a vehicle speed to regulate an elastic force of the diaphragm elastic member.

2. The automatic transmission for the vehicle of claim 1, further including:
a first link portion provided on the rotation shaft and hinged to the first end portion of the first connecting member;
a second link portion provided on the rotation shaft, provided under the first link portion, hinged to the second end portion of the second connecting member, and having a lower surface coupled to the slider portion; and
a compression elastic member provided on the rotation shaft, disposed between the first link portion and the second link portion, and provided to apply an elastic force to the first link portion and the second link portion.

3. The automatic transmission for the vehicle of claim 2, wherein the elastic regulator is configured to compress or relax the compression elastic member to vertically slide the slider portion along the axial direction of the rotation shaft, and vertically slides the slider portion along the axial direction of the rotation shaft to regulate the elastic force of the diaphragm elastic member.

4. The automatic transmission for the vehicle of claim 3, wherein the controller is configured to control the elastic regulator depending on the vehicle speed to compress or relax the compression elastic member to vertically slide the slider portion along the axial direction of the rotation shaft, and vertically slides the slider portion along the axial direction of the rotation shaft to regulate the elastic force of the diaphragm elastic member.

5. The automatic transmission for the vehicle of claim 2, wherein the elastic regulator includes:
a motor connected to the controller;
a cam gear provided on the rotation shaft and connected to the motor;
a base portion provided on the rotation shaft and integrally formed with the cam gear; and
a compression elastic member position regulator provided on the rotation shaft, disposed between the base portion and the compression elastic member, and moving upward and downward along the rotation shaft according to rotation of the motor to compress or relax the compression elastic member.

6. The automatic transmission for the vehicle of claim 2, wherein the elastic regulator includes:
a cylinder disposed above the compression elastic member;
a pressure providing portion engaged to the cylinder and providing a pressure to the cylinder; and
a piston slidably disposed inside the cylinder, disposed above the compression elastic member and moving upward and downward as a pressure is applied to the cylinder to compress or relax the compression elastic member.

7. The automatic transmission for the vehicle of claim 2, wherein the elastic regulator includes:
- first and second magnetic bodies having a same pole on facing sides of the first and second magnetic bodies and disposed above and under each other while being spaced from each other; and
- a piston coupled to a lower surface of the first magnetic body disposed on a lower side of the first and second magnetic bodies and disposed above the compression elastic member and moving upward and downward as a magnetic force of at least one of the first and second magnetic bodies is changed to compress or relax the compression elastic member.

8. The automatic transmission for the vehicle of claim 7, wherein the second magnetic body disposed above the first magnetic body is positioned to be stationary.

9. The automatic transmission for the vehicle of claim 1, wherein the diaphragm elastic member is provided to be deformed to a first side or a second side in the axial direction of the rotation shaft when reaching a predetermined amount of deformation, and
- the shift fork is connected to the diaphragm elastic member or the slider portion so that the synchronizer starts to be engaged with the shift stage gear when the diaphragm elastic member is deformed.

10. The automatic transmission for the vehicle of claim 1, wherein the shift fork is fixedly coupled to the diaphragm elastic member or the slider portion to integrally slide therewith.

* * * * *